UNITED STATES PATENT OFFICE.

JOSEPH LE ROY WEBBER, OF DETROIT, MICHIGAN.

PROCESS OF PREPARING PEPSIN.

SPECIFICATION forming part of Letters Patent No. 449,839, dated April 7, 1891.

Application filed December 24, 1890. Serial No. 375,726. (No specimens.)

*To all whom it may concern:*

Be it known that I, JOSEPH LE ROY WEBBER, a citizen of the United States, residing at Detroit, in the county of Wayne and State of Michigan, have invented a new and useful Improvement in Processes of Manufacturing Pepsin, of which the following is a specification.

My invention relates to an improved process of treating the mucous membranes from animals' stomachs, particularly those of the pig, to obtain therefrom pepsin.

The objects of my improved treatment are materially to decrease, compared with other processes hitherto practiced in the manufacture of pepsin, the cost of manufacturing this ferment for the market, and to obtain the product as the result of the treatment in an exceptionally pure condition, wherein it is practically free from mucus and similar substances, which when present lend to the product a putrescible character, and devoid of offensive odor from peptone, the presence of which renders the product hygroscopic and prone to decomposition, but which may be completely eliminated by my improved treatment.

Following is a detailed description of my improved process: The mucous membranes from which the yield is to be obtained are digested with weak hydrochloric acid or acidulated water at from about 40° centigrade to 50° centigrade until they undergo self-digestion and solution thereof is effected. I then add sulphurous acid in sufficient quantity to preserve the solution from decomposition and allow the liquid to clarify itself by precipitation of mucus, thus without causing any material injury to the ferment from putrefactive changes. The comparatively clear liquid is next drawn off and then saturated with sodium sulphate, which may be in the form of "salt cake" or Glauber's salt, the temperature of the liquid to be maintained, preferably, at about 34° centigrade until complete or substantially complete separation of the pepsin results by precipitation. It should be here stated that the temperature herein given is found to produce the best results, but that it may be higher or lower within a considerable range and still operate advantageously. Hence I desire to be understood as employing the qualifying terms in connection with the statement of temperature in degrees as including such range as will serve my purpose of improvement. The pepsin precipitate thus obtained, when collected, pressed, and dried, constitutes the first or "crude" product, which, however, is marketable, being very active and meeting certain requirements of trade. To purify this first product it is dissolved, preferably, while yet moist in weak hydrochloric acid, and the solution is subjected to dialysis until the sodium sulphate is sufficiently removed. The liquid is then subjected to concentration, which may be performed *in vacuo* or in the open air, and the concentrate is dried on plates of glass or by other suitable means. By then allowing the solution from which the pepsin precipitate has been removed, and which contains the sodium sulphate and practically all of the peptone, to cool gradually, the sodium sulphate will crystallize out, leaving the peptone in solution. Thus about ninety per cent. of the salt may be recovered for subsequent use in practicing my process, and at the same time the peptone is speedily and economically removed.

From the foregoing it will appear that I have discovered that sulphurous acid added to the macerate of animals' stomachs in weak hydrochloric acid effects clarification of the solution without material injury to the ferment pepsin; that sodium sulphate, when added to such a clarified solution to a state of complete or nearly complete saturation at about 34° centigrade, effects precipitation of the pepsin without precipitating the peptone, thereby producing ready separation of the active ferment pepsin from the inert peptone, with which the so-called "peptone-pepsins" of commerce are contaminated, and are thereby rendered hygroscopic and exceedingly prone to undergo putrefactive changes.

I am aware that common salt (sodium chloride) and other mineral salts have heretofore been employed for effecting the separation of pepsin from the cold infusion of pigs' stomachs; but sodium sulphate has never, so far as I am aware, been used in the manner hereinbefore stated, whereby an increased yield of the ferment is obtained by the consequent precipitation, which is practically complete, while hitherto it has been but partial.

The recovery by recrystallization, which my improved process permits, of more than ninety per cent. of the precipitant sodium sulphate, thereby saving it for similar subsequent use, materially decreases the cost of production and forms an important advantage in my discovery.

What I claim as new, and desire to secure by Letters Patent, is—

1. In the manufacture of pepsin from macerated animals' stomachs in acidulated water, the process of clarifying the resultant solution, which consists in adding thereto sulphurous acid, substantially as and for the purpose set forth.

2. In the manufacture of pepsin from macerated animals' stomachs in acidulated water, the process of separating the pepsin from the peptone, which consists in clarifying the first solution and then adding to the clarified solution at a comparatively high temperature within the range specified a sufficient quantity of sodium sulphate, thereby effecting precipitation of the pepsin without precipitating the peptone, substantially as described.

3. The process of manufacturing pepsin, which consists in macerating animals' stomachs in acidulated water, clarifying the resultant solution, adding to the clarified solution at a comparatively high temperature within the range specified a saturating quantity of sodium sulphate, thereby effecting precipitation of the pepsin without precipitating the peptone, and cooling the residuary solution and thereby crystallizing out and separating from the peptone the sodium sulphate, substantially as and for the purpose set forth.

4. The process of manufacturing pepsin, which consists in macerating animals' stomachs in acidulated water, adding to the resultant solution sulphurous acid and clarifying it by precipitation, drawing off the clarified liquid and saturating the same at a suitable temperature with sodium sulphate, thereby producing complete or substantially complete precipitation of the pepsin and forming the first product thereof, dissolving the said first product in weak hydrochloric acid and removing sodium sulphate from the solution by dialysis, and concentrating the resultant liquid and drying the concentrate and recovering the sodium sulphate from the solution from which the said first product is precipitated by gradually cooling it to crystallize out the sodium sulphate and separate it from the peptone, substantially as described.

JOSEPH LE ROY WEBBER.

In presence of—
ANDREW J. LINZEE,
D. GERMAIN.